(12) United States Patent
Tanaka (10) Patent No.: US 12,437,417 B2
(45) Date of Patent: Oct. 7, 2025

(54) FEATURE DETECTION DEVICE, FEATURE DETECTION METHOD, AND COMPUTER PROGRAM FOR DETECTING FEATURE

(71) Applicant: TOYOTA JIDOSHA KABUSHIKI KAISHA, Toyota (JP)

(72) Inventor: Masahiro Tanaka, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 383 days.

(21) Appl. No.: 18/177,851

(22) Filed: Mar. 3, 2023

(65) Prior Publication Data

US 2023/0316539 A1    Oct. 5, 2023

(30) Foreign Application Priority Data

Apr. 1, 2022   (JP) .................. 2022-062056

(51) Int. Cl.
*G06T 7/20* (2017.01)
*G06T 7/70* (2017.01)

(52) U.S. Cl.
CPC .................. *G06T 7/20* (2013.01); *G06T 7/70* (2017.01); *G06T 2207/10032* (2013.01); *G06T 2207/30264* (2013.01)

(58) Field of Classification Search
CPC ... G06T 7/20; G06T 7/70; G06T 2207/10032; G06T 2207/30264; G06T 2207/20081; G06T 2207/20084; G06T 2207/30252; G06T 7/73; G06T 7/246; G06V 20/58; G06V 20/588; G01C 21/3407; G01C 21/20

See application file for complete search history.

(56) References Cited

U.S. PATENT DOCUMENTS

2010/0040289 A1   2/2010   Irie et al.
2013/0088578 A1   4/2013   Umezawa et al.

FOREIGN PATENT DOCUMENTS

| JP | 2009205403 A | | 9/2009 |
|---|---|---|---|
| JP | 2013093013 A | | 5/2013 |
| JP | 2018096935 A | | 6/2018 |
| JP | 2020-091255 | * | 6/2020 |
| JP | 2020175890 A | | 10/2020 |

OTHER PUBLICATIONS

Machine translation for JP 2020-091255 (Year: 2020).*

* cited by examiner

*Primary Examiner* — Qian Yang
(74) *Attorney, Agent, or Firm* — Dickinson Wright, PLLC (57) ABSTRACT

A feature detection device includes a processor configured to determine whether a vehicle is parked, based on at least one of the speed, steering angle, and shifter position of the vehicle; detect one or more predetermined features from a first image representing a first area around the vehicle in a section of road in which the vehicle is traveling, the first image being generated by a first camera provided on the vehicle, and detect the one or more predetermined features from a second image representing a second area closer to the vehicle than the first area in a section of road in which the vehicle is parked, the second image being generated by a second camera provided on the vehicle.

4 Claims, 7 Drawing Sheets

FEATURE DETECTION DEVICE, FEATURE DETECTION METHOD, AND COMPUTER PROGRAM FOR DETECTING FEATURE

FIELD

The present invention relates to a feature detection device, a feature detection method, and a computer program for detecting a feature from an image.

BACKGROUND

A technique to detect features related to travel of vehicles from an image of the surroundings of a traveling vehicle generated by a camera mounted on the vehicle has been proposed (see Japanese Unexamined Patent Publication JP2009-205403A).

An apparatus for recognizing a road marking disclosed in JP2009-205403A transforms images captured by an in-vehicle camera into images representing a downward view from above and combines the transformed images in chronological order to generate a combined image. The apparatus further extracts characteristics of the combined image and compares the characteristics with prepared templates of reference characteristics to determine the type of road marking in the combined image. The apparatus then detects the position of a host vehicle relative to the road marking.

SUMMARY

In some cases, there is an obstacle that covers a feature as viewed from a vehicle-mounted camera, such as a parked vehicle, on the road. At a place where such an obstacle exists, it may be difficult to detect a detection target feature from an image generated by a vehicle-mounted camera because the feature is not represented in the image. This may result in failure in generating data representing such a feature.

It is an object of the present invention to provide a feature detection device that detects a feature from an image generated by a camera mounted on a vehicle.

According to an embodiment, a feature detection device is provided. The feature detection device includes a processor configured to: determine whether a vehicle is parked, based on at least one of the speed, steering angle, and shifter position of the vehicle, detect one or more predetermined features from a first image representing a first area around the vehicle in a section of road in which the vehicle is traveling, the first image being generated by a first camera provided on the vehicle, and detect the one or more predetermined features from a second image representing a second area closer to the vehicle than the first area in a section of road in which the vehicle is parked, the second image being generated by a second camera provided on the vehicle.

The processor of the feature detection device preferably executes viewpoint transformation on the second image to generate an aerial image, and detects the one or more predetermined features from the generated aerial image.

The processor is preferably further configured to: estimate a positional relationship between the vehicle and a first feature among the one or more predetermined features, based on the position of the first feature in each of two or more of the first images acquired at different timings during travel of the vehicle and the distance traveled by the vehicle between the timings of acquisition of the two or more of the first images, estimate a real-space position of the first feature, based on the estimated positional relationship, identify the position of the first feature in the aerial image, based on the positional relationship between the vehicle and the first feature, and estimate a real-space position of a second feature detected from the aerial image among the one or more predetermined features, based on a positional relationship between the positions of the first feature and the second feature in the aerial image as well as the real-space position of the first feature.

The processor is preferably further configured to generate data representing the one or more detected predetermined features.

According to another embodiment, a method for detecting a feature is provided. The method includes determining whether a vehicle is parked, based on at least one of the speed, steering angle, and shifter position of the vehicle; detecting one or more predetermined features from a first image representing a first area around the vehicle in a section of road in which the vehicle is traveling; and detecting the one or more predetermined features from a second image representing a second area closer to the vehicle than the first area in a section of road in which the vehicle is parked. The first image is generated by a first image capturing unit provided on the vehicle, and the second image is generated by a second image capturing unit provided on the vehicle.

According to still another embodiment, a non-transitory recording medium that stores a computer program for detecting a feature is provided. The computer program includes instructions causing a computer to execute a process including determining whether a vehicle is parked, based on at least one of the speed, steering angle, and shifter position of the vehicle; detecting one or more predetermined features from a first image representing a first area around the vehicle in a section of road in which the vehicle is traveling; and detecting the one or more predetermined features from a second image representing a second area closer to the vehicle than the first area in a section of road in which the vehicle is parked. The first image is generated by a first image capturing unit provided on the vehicle, and the second image is generated by a second image capturing unit provided on the vehicle.

The feature detection device according to the present disclosure has an advantageous effect of being able to generate data representing a feature, based on an image generated by a camera mounted on a vehicle.

DESCRIPTION OF EMBODIMENTS

A feature detection device, a feature detection method executed by the feature detection device, and a computer program therefor will now be described with reference to the attached drawings. Regarding a predetermined region, the feature detection device collects images representing features related to travel of a vehicle and information on travel of a vehicle from one or more communicable vehicles.

Each vehicle that transmits images to the feature detection device includes multiple cameras that capture different areas, and generates images representing the surroundings of the vehicle with each camera. For each camera, the vehicle transmits time-series images generated by the camera, the times of generation of the images, and information on travel of the vehicle to the feature detection device.

The feature detection device detects timing at which the vehicle is parked, based on at least one of the speed, steering angle, and shifter position of the vehicle included in the information on travel of the vehicle. Except at timing when the vehicle is parked, the feature detection device detects a feature from an image generated by a camera, of the multiple cameras, that can capture an area extending relatively far from the vehicle. At the timing when the vehicle is parked, the feature detection device transforms an image generated by a camera, of the multiple cameras, that captures an area relatively close to the vehicle into an aerial image, and detects a feature from the aerial image after transformation. In addition, the feature detection device estimates the position of each feature, based on the positions of the vehicle at the times of generation of two or more images from which the same feature is detected. The feature detection device then generates data including information indicating the types and the positions of the detected individual features as data representing the features. In the following, data representing a feature will be referred to simply as "feature data."

Examples of detection target features include various signposts, various road markings, traffic lights, and other features related to travel of a vehicle.

Figure 1:
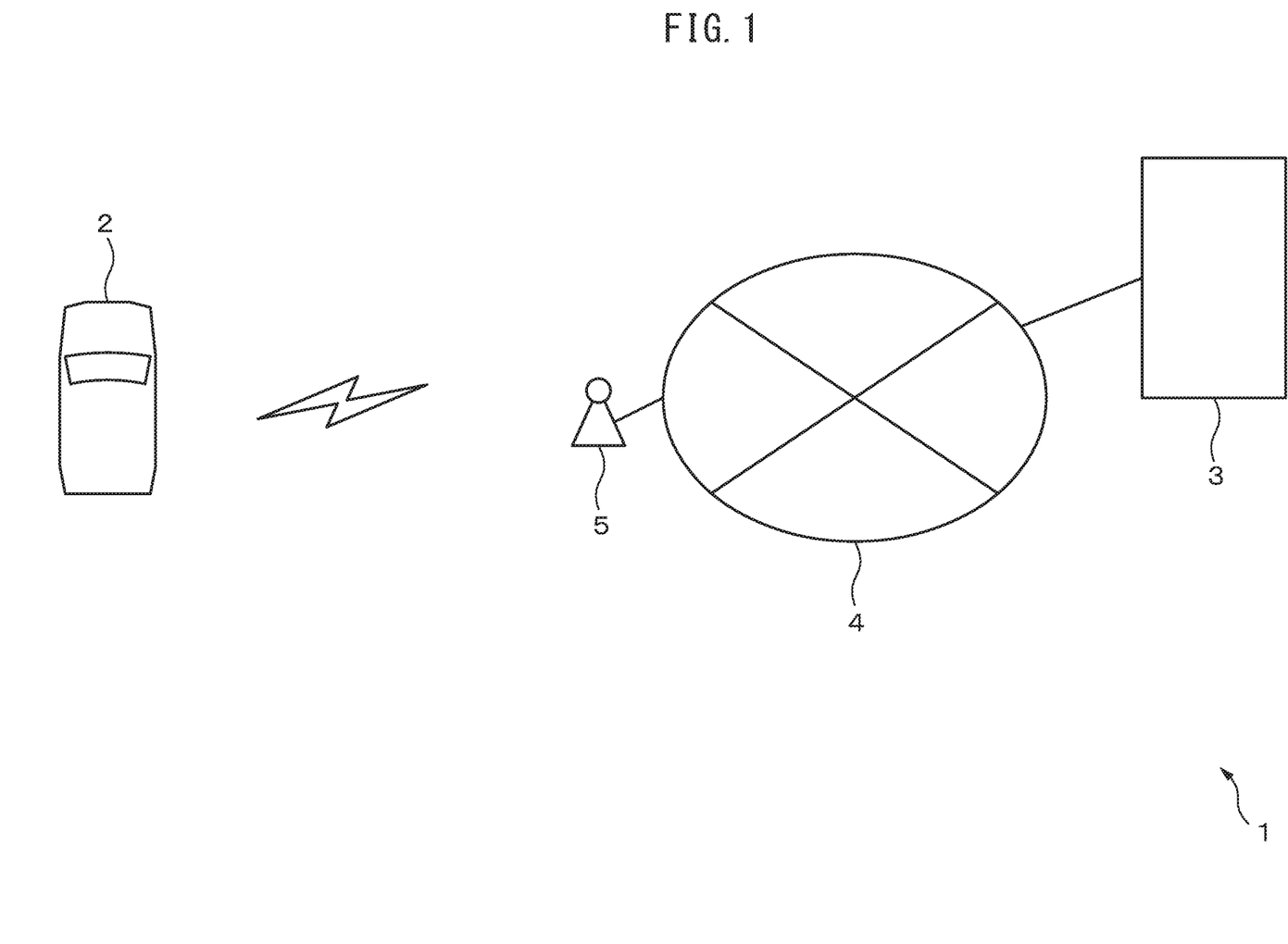
FIG. 1 schematically illustrates the configuration of a feature data collecting system equipped with a feature detection device.

FIG. 1 schematically illustrates the configuration of a feature data collecting system equipped with the feature detection device. In the present embodiment, the feature data collecting system 1 includes at least one vehicle 2 and a server 3, which is an example of the feature detection device. Each vehicle 2 accesses a wireless base station 5, which is connected, for example, via a gateway (not illustrated) to a communication network 4 connected with the server 3, thereby connecting to the server 3 via the wireless base station 5 and the communication network 4. For simplicity, FIG. 1 illustrates only a single vehicle 2, but the feature data collecting system 1 may include multiple vehicles 2. FIG. 1 also illustrates only a single wireless base station 5, but the communication network 4 may be connected with multiple wireless base stations 5.

Figure 2:
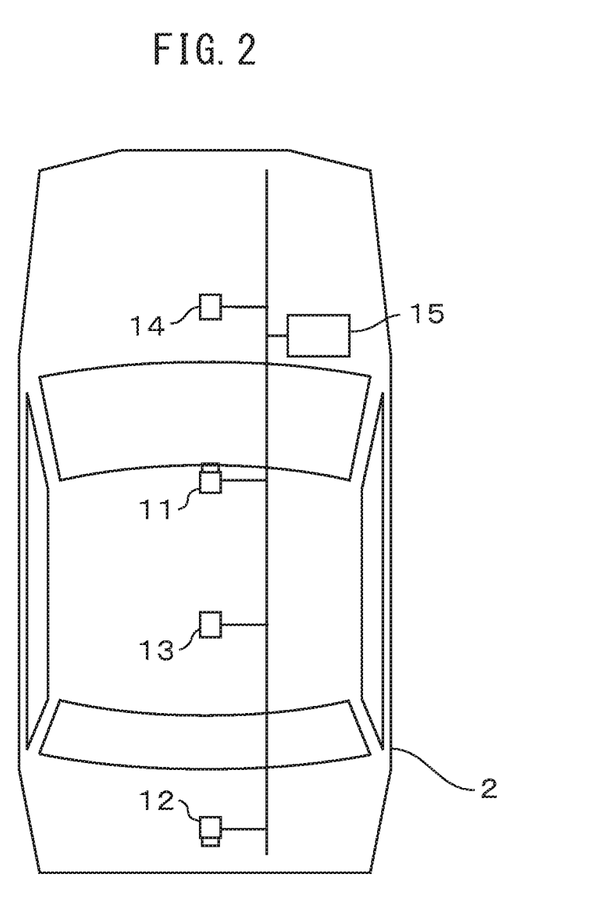
FIG. 2 schematically illustrates the configuration of a vehicle.

FIG. 2 schematically illustrates the configuration of the vehicle 2. The vehicle 2 includes a camera 11, a panoramic camera 12, a GPS receiver 13, a wireless communication terminal 14, and a data acquisition device 15, which are communicably connected via an in-vehicle network conforming to a standard such as a controller area network. The vehicle 2 may further include a navigation device (not illustrated) that searches for a planned travel route of the vehicle 2 and that navigates so that the vehicle 2 travels along the planned travel route.

The camera 11, which is an example of the first image capturing unit, includes a two-dimensional detector constructed from an array of optoelectronic transducers, such as CCD or C-MOS, having sensitivity to visible light and a focusing optical system that forms an image of a target region of capturing (first area) on the two-dimensional detector. The camera 11 is mounted, for example, in the interior of the vehicle 2 so as to be oriented to the front of the vehicle 2. The camera 11 captures a region in front of the vehicle 2 every predetermined capturing period (e.g., 1/30 to 1/10 seconds), and generates images representing the region. The camera 11 may be mounted on the vehicle 2 in a different orientation, for example, so as to be oriented to the rear of the vehicle 2. Each image generated by the camera 11 is an example of the first image, and may be a color or grayscale image.

Whenever an image is generated, the camera 11 outputs the generated image to the data acquisition device 15 via the in-vehicle network.

The panoramic camera 12, which is an example of the second image capturing unit, includes a two-dimensional detector constructed from an array of optoelectronic transducers, such as CCD or C-MOS, having sensitivity to visible light and a focusing optical system that forms an image of a target region of capturing (second area) on the two-dimensional detector. The panoramic camera 12 is mounted on the vehicle 2 so as to capture an area closer to the vehicle 2 than the camera 11 does. For example, the panoramic camera 12 is oriented obliquely downward on the vehicle 2 so that a lower area around the vehicle 2 is included in the captured area. Thus the area captured by the panoramic camera 12 is smaller than the area captured by the camera 11. In the present embodiment, the focal length of the panoramic camera 12 is shorter than that of the camera 11, but this is not necessary. The panoramic camera 12 captures a surrounding region around the vehicle 2 every predetermined capturing period (e.g., 1/30 to 1/10 seconds), and generates images representing the surrounding region. The capturing period and timing of the camera 11 can be independent of those of the panoramic camera 12. Each image generated by the panoramic camera 12 is an example of the second image, and may be a color or grayscale image.

The vehicle 2 may include multiple panoramic cameras 12 that take pictures in different orientations. For example, a panoramic camera 12 may be mounted on the front end of the vehicle 2 so as to be oriented to the lower front of the vehicle 2, and another panoramic camera 12 may be mounted on the rear end of the vehicle 2 so as to be oriented to the lower rear of the vehicle 2. Alternatively, four panoramic cameras 12 may be mounted on the front end, rear end, and left and right sides of the vehicle 2 so that all of the surroundings of the vehicle 2 can be captured.

Whenever an image is generated, the panoramic camera 12 outputs the generated image to the data acquisition device 15 via the in-vehicle network. In the following, an image generated by the panoramic camera 12 will be referred to as a "panoramic image" so as to be distinguished from an image generated by the camera 11.

Whenever a panoramic image is generated, the panoramic camera 12 outputs the generated panoramic image to the data acquisition device 15 via the in-vehicle network.

The GPS receiver 13 receives GPS signals from GPS satellites at predetermined intervals, and determines the position of the vehicle 2, based on the received GPS signals. The predetermined intervals at which the GPS receiver 13 determines the position of the vehicle 2 may differ from the capturing periods of the camera 11 and the panoramic camera 12. The GPS receiver 13 outputs positioning information indicating the result of determination of the position of the vehicle 2 based on the GPS signals to the data acquisition device 15 via the in-vehicle network at predetermined intervals. The vehicle 2 may include a receiver conforming to a satellite positioning system other than the GPS receiver 13. In this case, the receiver determines the position of the vehicle 2.

The wireless communication terminal 14, which is an example of a communication unit, is a device to execute a wireless communication process conforming to a predetermined standard of wireless communication, and accesses, for example, the wireless base station 5 to connect to the server 3 via the wireless base station 5 and the communication network 4. The wireless communication terminal 14 generates an uplink radio signal including image information or travel information received from the data acquisition device 15, and transmits the uplink radio signal to the wireless base station 5 to transmit the image information and the travel information to the server 3. In addition, the wireless communication terminal 14 receives a downlink radio signal from the wireless base station 5, and passes, for example, a collection instruction from the server 3 included in the radio signal to the data acquisition device 15 or an electronic control unit (ECU, not illustrated) that controls travel of the vehicle 2.

Figure 3:
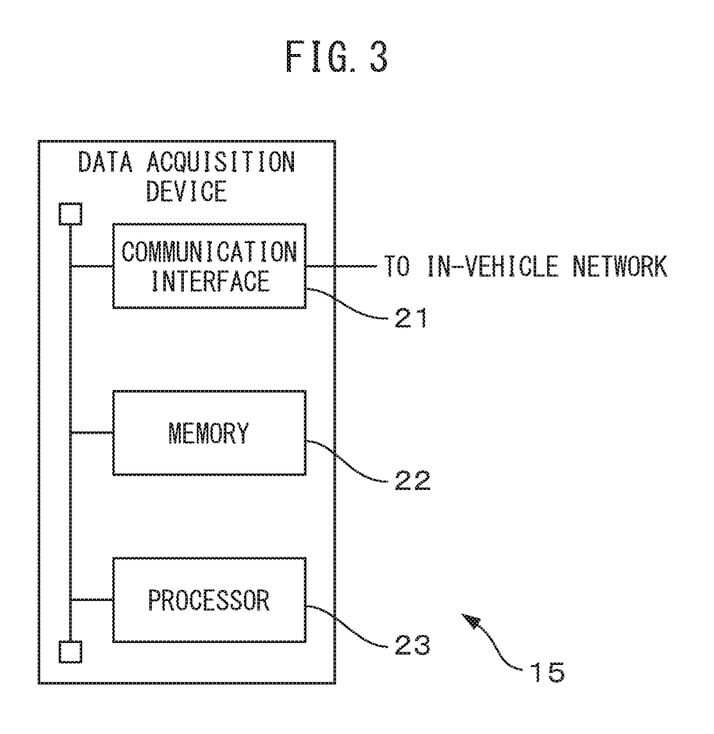
FIG. 3 illustrates the hardware configuration of a data acquisition device.

FIG. 3 illustrates the hardware configuration of the data acquisition device. The data acquisition device 15 generates image information including an image generated by the camera 11 and a panoramic image generated by the panoramic camera 12, and further generates travel information indicating traveling motion of the vehicle 2. To achieve this, the data acquisition device 15 includes a communication interface 21, a memory 22, and a processor 23.

The communication interface 21, which is an example of an in-vehicle communication unit, includes an interface circuit for connecting the data acquisition device 15 to the in-vehicle network. In other words, the communication interface 21 is connected to the camera 11, the panoramic camera 12, the GPS receiver 13, and the wireless communication terminal 14 via the in-vehicle network. Whenever an image is received from the camera 11, the communication interface 21 passes the received image to the processor 23. Similarly, whenever a panoramic image is received from the panoramic camera 12, the communication interface 21 passes the received panoramic image to the processor 23. Whenever positioning information is received from the GPS receiver 13, the communication interface 21 passes the received positioning information to the processor 23. Further, the communication interface 21 passes, to the processor 23, that instruction to collect image information which is received from the server 3 via the wireless communication terminal 14. Further, the communication interface 21 outputs image information and travel information received from the processor 23 to the wireless communication terminal 14 via the in-vehicle network.

The memory 22 includes, for example, volatile and nonvolatile semiconductor memories. The memory 22 may further include other storage, such as a hard disk drive. The memory 22 stores various types of data used in a process related to image collection executed by the processor 23 of the data acquisition device 15. Such data includes, for example, identifying information of the vehicle 2 and parameters of the camera 11 and the panoramic camera 12, such as the heights of the mounted positions, the orientations, and the angles of view of the cameras 11 and 12. The memory 22 may also store images received from the camera 11, panoramic images received from the panoramic camera 12, and positioning information received from the GPS receiver 13 for a certain period. In addition, the memory 22 stores information indicating a target region for generating and collecting feature data (hereafter a "collection target region") specified in an instruction to collect feature data. The memory 22 may further store a computer program for implementing various processes executed by the processor 23.

The processor 23 includes one or more central processing units (CPUs) and a peripheral circuit thereof. The processor 23 may further include another operating circuit, such as a logic-arithmetic unit, an arithmetic unit, or a graphics processing unit. The processor 23 stores images received from the camera 11, panoramic images received from the panoramic camera 12, positioning information received from the GPS receiver 13, and information indicating the motion of the vehicle 2 received from the ECU, in the memory 22. In addition, the processor 23 executes the process related to image collection at predetermined intervals (e.g., 0.1 to 10 seconds) during travel of the vehicle 2.

As the process related to image collection, for example, the processor 23 determines whether the position of the vehicle 2 indicated by positioning information received from the GPS receiver 13 is within a collection target region. When the position of the vehicle is within a collection target region, the processor 23 generates image information including an image received from the camera 11 and a panoramic image received from the panoramic camera 12.

The processor 23 includes an image generated by the camera 11, the time of generation of the image, the travel direction of the vehicle 2 at the time of generation, and the parameters of the camera 11, such as the height of the mounted position, the orientation, and the angle of view of the camera 11, in image information. Similarly, the processor 23 includes a panoramic image, the time of generation of the panoramic image, the travel direction of the vehicle 2 at the time of generation, and the parameters of the panoramic camera 12, such as the height of the mounted position, the orientation, and the angle of view of the panoramic camera 12, in the image information. The processor 23 obtains information indicating the travel direction of the vehicle 2 from the ECU of the vehicle 2. Whenever image information is generated, the processor 23 transmits the generated image information to the server 3 via the wireless communication terminal 14. The processor 23 may include multiple images or multiple panoramic images, the times of generation of the respective images or panoramic images, and the travel directions of the vehicle 2 in a single piece of image information. The processor 23 may transmit the parameters of the camera 11 and the panoramic camera 12 to the server 3 via the wireless communication terminal 14 separately from image information.

The processor 23 further generates travel information of the vehicle 2 after predetermined timing (e.g., timing at which an ignition switch of the vehicle 2 is turned on), and transmits the travel information to the server 3 via the wireless communication terminal 14. The processor 23 includes, in the travel information, a series of pieces of positioning information acquired after the predetermined timing, the times of acquisition of the respective pieces of positioning information, and information indicating the motion of the vehicle 2 used for dead reckoning, such as wheel speeds, accelerations, and angular velocities, obtained from the ECU. The processor 23 may further include identifying information of the vehicle 2 in the travel information and the image information.

Figure 4:
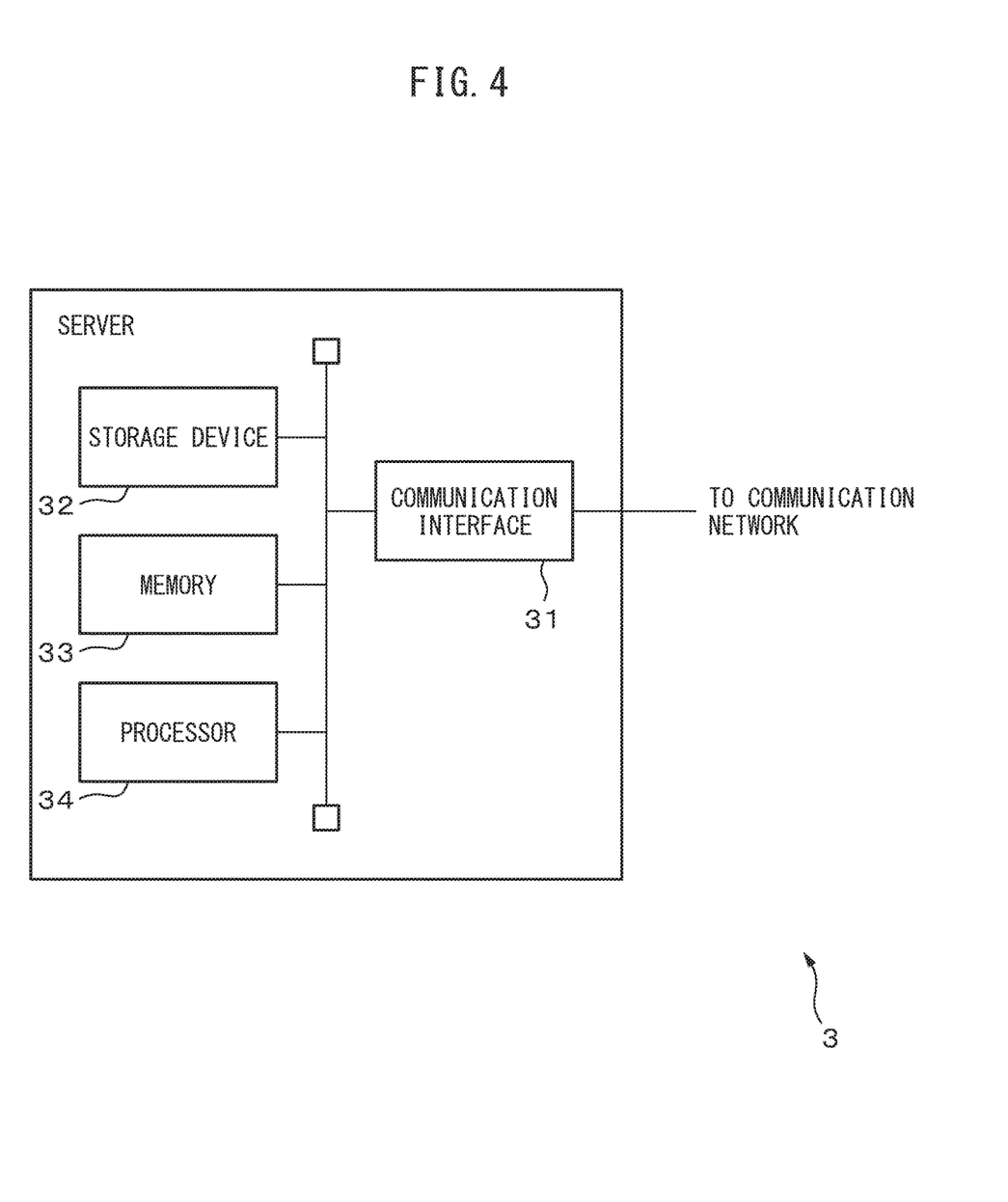
FIG. 4 illustrates the hardware configuration of a server, which is an example of the feature detection device.

The following describes the server 3, which is an example of the feature detection device. FIG. 4 illustrates the hardware configuration of the server 3, which is an example of the feature detection device. The server 3 includes a communication interface 31, a storage device 32, a memory 33, and a processor 34. The communication interface 31, the storage device 32, and the memory 33 are connected to the processor 34 via a signal line. The server 3 may further include an input device, such as a keyboard and a mouse, and a display device, such as a liquid crystal display.

The communication interface 31, which is an example of a communication unit, includes an interface circuit for connecting the server 3 to the communication network 4. The communication interface 31 is configured to be communicable with the vehicle 2 via the communication network 4 and the wireless base station 5. More specifically, the communication interface 31 passes, to the processor 34, image information and travel information received from the vehicle 2 via the wireless base station 5 and the communication network 4. In addition, the communication interface 31 transmits a collection instruction received from the processor 34 to the vehicle 2 via the communication network 4 and the wireless base station 5.

The storage device 32, which is an example of a storage unit, includes, for example, a hard disk drive, or an optical medium and an access device therefor, and stores various types of data and information used in a feature detection process. For example, the storage device 32 stores a set of parameters for defining a classifier for detecting features from various images and identifying information of the vehicles 2. The storage device 32 further stores image information and travel information received from each vehicle 2. The storage device 32 may further store a computer program for the feature detection process executed by the processor 34.

The memory 33, which is another example of a storage unit, includes, for example, nonvolatile and volatile semiconductor memories. The memory 33 temporarily stores various types of data generated during execution of the feature detection process.

The processor 34, which is an example of a control unit, includes one or more central processing units (CPUs) and a peripheral circuit thereof. The processor 34 may further include another operating circuit, such as a logic-arithmetic unit, an arithmetic unit, or a graphics processing unit. The processor 34 executes the feature detection process.

Figure 5:
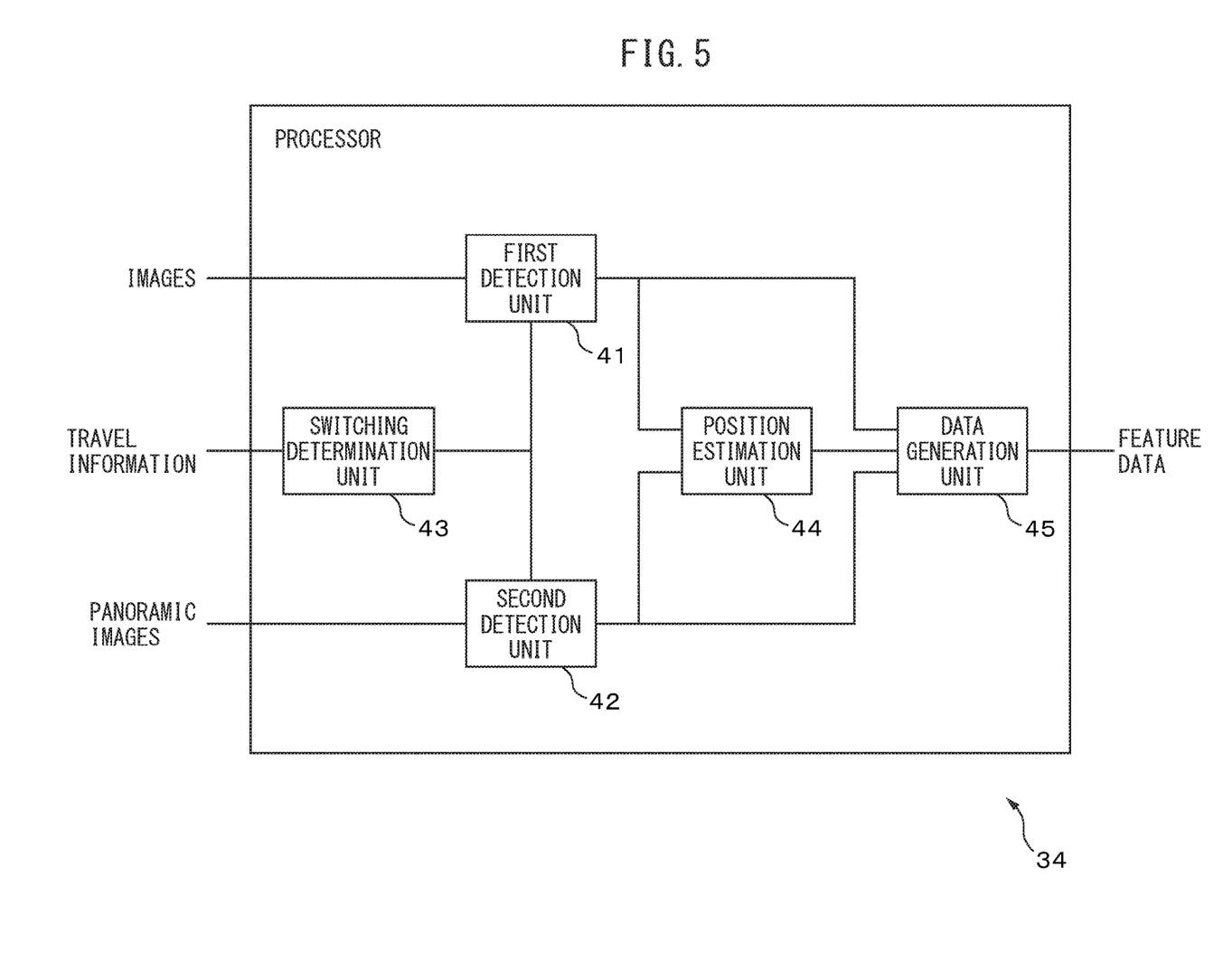
FIG. 5 is a functional block diagram of a processor of the server, related to a feature detection process.

FIG. 5 is a functional block diagram of the processor 34, related to the feature detection process. The processor 34 includes a first detection unit 41, a second detection unit 42, a switching determination unit 43, a position estimation unit 44, and a data generation unit 45. These units included in the processor 34 are functional modules, for example, implemented by a computer program executed by the processor 34, or may be dedicated operating circuits provided in the processor 34.

The first detection unit 41 detects features from individual images generated by the camera 11 in a section of road in which the first detection unit 41 is instructed to detect features by the switching determination unit 43 among time-series images generated by the camera 11, i.e., from individual images generated during travel of the vehicle 2.

The first detection unit 41 identifies images generated by the camera 11 in a section of road in which the first detection unit 41 is instructed to detect features by the switching determination unit 43, by referring to the times of generation of images included in image information received from the vehicle 2. The first detection unit 41 then inputs each identified image into a classifier that has been trained to detect a detection target feature, thereby detecting a feature represented in the inputted image (hereafter simply the "input image"). As such a classifier, the first detection unit 41 can use a deep neural network (DNN) that has been trained to detect a feature represented in an input image from the input image. As such a DNN, for example, a DNN having architecture of a convolutional neural network (CNN) type, e.g., Single Shot MultiBox Detector (SSD) or Faster R-CNN, is used. Alternatively, as such a DNN, a DNN having architecture of a self-attention network (SAN) type, e.g., a Vision Transformer, may be used.

In this case, for each type of detection target feature (e.g., a traffic light, a lane-dividing line, a pedestrian crossing, and a stop line), the classifier calculates a confidence score indicating how likely the feature is represented in a region in the input image; the classifier calculates the confidence score for each of various regions in the input image. The classifier determines that the region where the confidence score of a certain type of feature is not less than a predetermined detection threshold represents the type of feature. The classifier then outputs information indicating a region including a detection target feature in the input image, e.g., a circumscribed rectangle of the detection target feature (hereafter an "object region") and information indicating the type of the feature represented in the object region.

Unlike the second detection unit 42, which will be described in detail below, the first detection unit 41 uses an image generated by the camera 11 as an input image into the classifier, without transforming the image into an aerial image. The reason for this is as follows: since the area captured by the camera 11 extends farther from the vehicle 2 than the area captured by the panoramic camera 12, transformation of an image into an aerial image results in a feature farther from the vehicle 2 than a certain distance being distorted in the aerial image, and thus the accuracy of identification cannot be expected to improve.

The first detection unit 41 notifies the position estimation unit 44 and the data generation unit 45 of the times of generation of the images, information indicating an object region including a detected feature in each image, and the type of the detected feature.

The second detection unit 42 detects features from panoramic images generated in a section of road in which the second detection unit 42 is instructed to detect features by the switching determination unit 43 among time-series panoramic images generated by the panoramic camera 12. In other words, the second detection unit 42 detects features from individual panoramic images generated in a section of road in which the vehicle 2 is parked.

The second detection unit 42 identifies panoramic images generated by the panoramic camera 12 in a section of road in which the second detection unit 42 is instructed to detect features by the switching determination unit 43, by referring to the times of generation of panoramic images included in image information received from the vehicle 2. The second detection unit 42 then executes viewpoint transformation on the identified individual panoramic images to generate aerial images, and detects features from the generated individual aerial images. In this way, the second detection unit 42 detects features from a series of panoramic images generated by the panoramic camera 12 mounted so as to take pictures in an orientation different from that of the camera 11. Thus the second detection unit 42 can detect a feature that is not represented in images generated by the camera 11, e.g., a feature covered by an obstacle on the road surface, such as a parked vehicle. Additionally, in particular, a feature depicted on the road surface, such as a road marking, is represented in an aerial image without being distorted much. Thus, detecting a feature from an aerial image into which a panoramic image is transformed enables the second detection unit 42 to improve the accuracy of feature detection.

For each panoramic image, the second detection unit 42 executes viewpoint transformation into a vertically downward virtual view from a predetermined height, using parameters such as the mounted position, the orientation, and the focal length of the panoramic camera 12. In this way, the second detection unit 42 generates a corresponding aerial image for each panoramic image. In the case where the vehicle 2 includes multiple panoramic cameras 12, the second detection unit 42 may execute viewpoint transformation on each panoramic image generated at the same timing by the panoramic cameras 12 and combine the images to generate a single aerial image. The second detection unit 42 then inputs each aerial image into a classifier that has been trained to detect a detection target feature, thereby detecting a feature represented in the input image. As such a classifier, the second detection unit 42 uses the same classifier as the first detection unit 41. Alternatively, the second detection unit 42 may use a classifier different from that used by the first detection unit 41. In this case, the classifier used by the second detection unit 42 is trained in advance with aerial images used as input images. The classifier used by the second detection unit 42 can also be a DNN having architecture of a CNN or SAN type.

According to a modified example, the classifier used by the second detection unit 42 may be trained in advance with panoramic images themselves used as input images. In this case, the second detection unit 42 may input each panoramic image into the classifier, without executing viewpoint transformation, to detect a feature from each panoramic image. According to the modified example, the computational burden is reduced because viewpoint transformation is omitted.

The second detection unit 42 notifies the position estimation unit 44 and the data generation unit 45 of the times of generation of the panoramic images, information indicating an object region including a detected feature in each panoramic image, and the type of the detected feature.

The switching determination unit 43 determines whether the vehicle 2 is parked in a certain section of road, based on information indicating the motion of the vehicle 2 included in travel information, in particular, at least one of the speeds, steering angles, and shifter positions of the vehicle 2 at individual times during travel through a predetermined region. In a section of road in which the vehicle 2 is parked, the switching determination unit 43 causes the second detection unit to detect features. In a section of road in which the vehicle 2 is traveling, the switching determination unit 43 causes the first detection unit 41 to detect features.

For example, the switching determination unit 43 determines a section of road in which the speed of the vehicle 2 is not greater than a predetermined speed threshold, as a section of road in which the vehicle 2 is parked. In general, the travel direction of the vehicle 2 greatly changes at the time of parking. Thus the switching determination unit 43 may determine a section of road from when the speed of the vehicle 2 falls below a predetermined speed threshold and the steering angle of the vehicle 2 equals or exceeds a predetermined angle until the speed of the vehicle 2 exceeds the predetermined speed threshold, as a section of road in which the vehicle 2 is parked. Alternatively, the travel direction of the vehicle 2 may be switched to the backward direction at the time of parking. Thus the switching determination unit 43 may determine a section of road from a shift in the shifter position of the vehicle 2 to a reverse position until the next shift to a drive position, as a section of road in which the vehicle 2 is parked.

The switching determination unit 43 notifies the first detection unit 41 of the section of road in which the vehicle 2 travels through the predetermined region except the section of road in which the vehicle 2 is parked, and instructs the first detection unit 41 to detect features in the notified section of road. The switching determination unit 43 also notifies the second detection unit 42 of the section of road in which the vehicle 2 is parked, and instructs the second detection unit 42 to detect features in the notified section of road. In addition, the switching determination unit 43 notifies the position estimation unit 44 and the data generation unit 45 of the section of road in which the vehicle 2 is parked.

The position estimation unit 44 estimates the position of a feature detected from an image or a panoramic image.

In the section of road in which the vehicle 2 is traveling, the position estimation unit 44 of the present embodiment estimates the positions of the vehicle 2 at the times of generation of respective images and the positions of an individual detected feature relative to these positions in accordance with the technique of "structure from motion (SfM)." More specifically, the position estimation unit 44 estimates the positional relationship between a feature of interest and the vehicle 2, based on the position of the feature of interest in each of two or more images obtained at different timings during travel of the vehicle 2 and the distance traveled by the vehicle 2 between the timings of generation of the images. The position estimation unit 44 then estimates the real-space position of the feature of interest, based on the estimated positional relationship.

The positions of pixels in an image correspond one-to-one to the directions from the camera 11 to objects represented in the respective pixels. Thus the position estimation unit 44 can estimate the positional relationship between the vehicle 2 and a feature in each image, based on the direction from the camera 11 corresponding to a characteristic point representing the feature in the image, the distance traveled by the vehicle 2 between the times of generation of images, the travel direction of the vehicle 2, and the parameters of the camera 11.

The position estimation unit 44 can use the position of the vehicle 2 indicated by that positioning information obtained by the GPS receiver 13 at the predetermined timing which is included in travel information as a reference position of the vehicle 2. Thereafter, the position estimation unit 44 estimates the distance traveled by the vehicle 2 between the times of generation of images, using information used for dead reckoning, such as wheel speeds, accelerations, and angular velocities, included in travel information.

The position estimation unit 44 associates the same features detected in respective images obtained at different timings during travel of the vehicle 2 with each other. To this end, for example, the position estimation unit 44 can associate characteristic points included in object regions representing the same feature of interest in the respective images with each other, using a tracking technique using optical flow. The position estimation unit 44 can then estimate the positions of the vehicle 2 at the times of generation of the respective images and the positions of the feature of interest relative to the positions of the vehicle 2 at the times of generation of the respective images, by triangulation. To this end, the position estimation unit 44 uses the travel directions of the vehicle 2 at the times of generation of the respective images, the position of the vehicle 2 at the time of generation of one of the images, the distances traveled by the vehicle 2 between the times of generation of the images, the parameters of the camera 11, and the positions of the corresponding characteristic points in the respective images, for the triangulation.

The position estimation unit 44 can sequentially estimate the positions of the vehicle 2 at the times of generation of the respective images and the positions of each of the features around the vehicle 2 relative to these positions, by repeating the above-described process for each of the detected features. The position estimation unit 44 then estimates the real-space position of each feature, based on the estimated positions of the feature relative to those of the vehicle 2 and the reference position of the vehicle 2. When the position of one of the detected features is known, the position estimation unit 44 may estimate the real-space position of each detected feature, using the known position of the feature, instead of the reference position of the vehicle 2.

In addition, the position estimation unit 44 estimates the position of a feature detected from each aerial image, using the following procedure. The following describes a process on a single aerial image because the position estimation unit 44 executes the same process on each aerial image.

The position estimation unit 44 selects a feature detected from an image generated by the camera 11 in a predetermined period immediately before switching to feature detection from an panoramic image (hereafter a "first feature"). The position estimation unit 44 then identifies the position of the first feature relative to the panoramic camera 12 at the time of generation of a panoramic image of interest, based on the positional relationship between the first feature and the vehicle 2 as well as the mounted position of the panoramic camera 12. When the time of generation of the image from which the first feature is detected differs from that of the panoramic image of interest, the position estimation unit 44 determines the distance traveled by the vehicle 2 from the time of generation of the image from which the first feature is detected until the time of generation of the panoramic image of interest, by referring to travel information. The position estimation unit 44 then identifies the position of the first feature relative to the panoramic camera 12, taking account of the traveled distance. Further, the position estimation unit 44 identifies the position of the first feature in the aerial image, based on the parameters of the panoramic camera 12, the position of the first feature relative to the panoramic camera 12, and the virtual viewpoint used for viewpoint transformation. Further, the position estimation unit 44 identifies the real-space position of another feature detected from the aerial image (hereafter a "second feature") relative to the first feature, based on the positional relationship between the first feature and the second feature in the aerial image as well as the virtual viewpoint used for viewpoint transformation. The position estimation unit 44 then estimates the real-space position of the second feature, based on the real-space position of the first feature and the position of the second feature relative to the first feature.

In the modified example in which a feature is detected from a panoramic image at the time of parking the vehicle 2, the position estimation unit 44 executes a process similar to that described above on a second feature detected from a panoramic image instead of an aerial image, thereby estimating the real-space position of the second feature. Specifically, the position estimation unit 44 uses the parameters of the panoramic camera 12, instead of parameters of a virtual camera at the time of generation of the aerial image, to identify the real-space position of the second feature relative to the first feature.

The position estimation unit 44 notifies the data generation unit 45 of the real-space position of each feature.

The data generation unit 45 generates feature data representing features detected by the first detection unit 41 and features detected by the second detection unit 42. More specifically, for each feature detected by the first detection unit 41, the data generation unit 45 includes the type of the feature notified by the first detection unit 41 and the real-space position of the feature estimated by the position estimation unit 44, in the feature data. Similarly, for each feature detected by the second detection unit 42, the data generation unit 45 includes the type of the feature notified by the second detection unit 42 and the real-space position of the feature estimated by the position estimation unit 44, in the feature data.

The generated feature data is used for generating or updating a map. More specifically, for each feature represented in the feature data, the type and the position of the feature is written in a map to be generated or updated.

Figure 6:
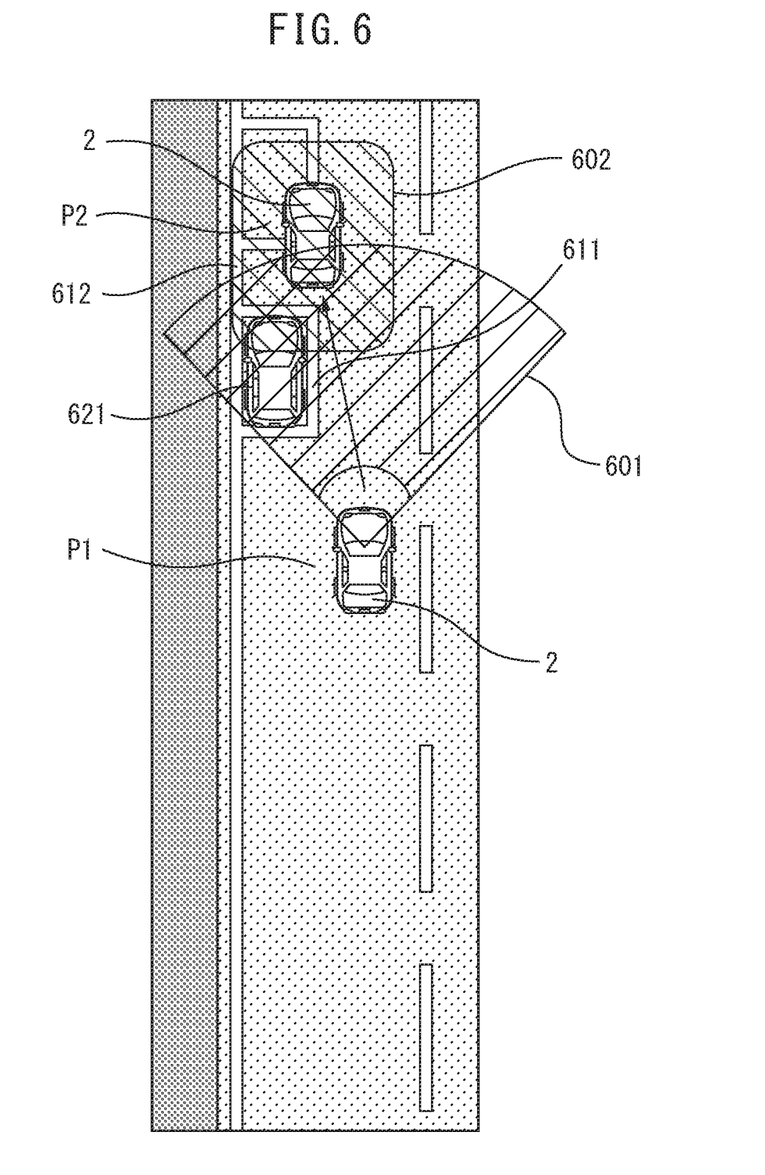
FIG. 6 schematically illustrates an example of the relationship between a feature detected by a first detection unit and a feature detected by a second detection unit.

FIG. 6 schematically illustrates an example of the relationship between a feature detected by the first detection unit 41 and a feature detected by the second detection unit 42 according to the present embodiment. In FIG. 6, when the vehicle 2 is at a position P1, the vehicle 2 is traveling, and the first detection unit 41 detects a feature from an image generated by the camera 11. For example, a lane-dividing line within an area 601 captured by the camera 11 is detected as a feature. At a position P2, the vehicle 2 is about to park, and the second detection unit 42 detects a feature from an aerial image obtained by executing viewpoint transformation on a panoramic image generated by the panoramic camera 12. For example, a lane-dividing line within an area 602 represented in the aerial image is detected as a feature. In particular, in this example, the captured area 601 overlaps the area 602 represented in the aerial image, and thus a road marking 611 in the overlap area is detected by both the first detection unit 41 and the second detection unit 42. Hence the position in the aerial image of the road marking 611, whose real-space position is estimated by the SfM technique, is identified. Additionally, when viewed from the position P1, part of a lane-dividing line 612 on a road edge is covered by a parked vehicle 621, and is thus not represented in images generated by the camera 11. Hence the first detection unit 41 cannot detect the part of the lane-dividing line 612 from images generated by the camera 11. However, the part of the lane-dividing line 612 is included in the area 602 represented in the aerial image generated at the position P2. Hence the second detection unit 42 can detect the part of the lane-dividing line 612. Further, the real-space position of the part of the lane-dividing line 612 is also estimated on the basis of the real-space position of the road marking 611 and the positional relationship between the road marking 611 and the part of the lane-dividing line 612 in the aerial image.

Figure 7:
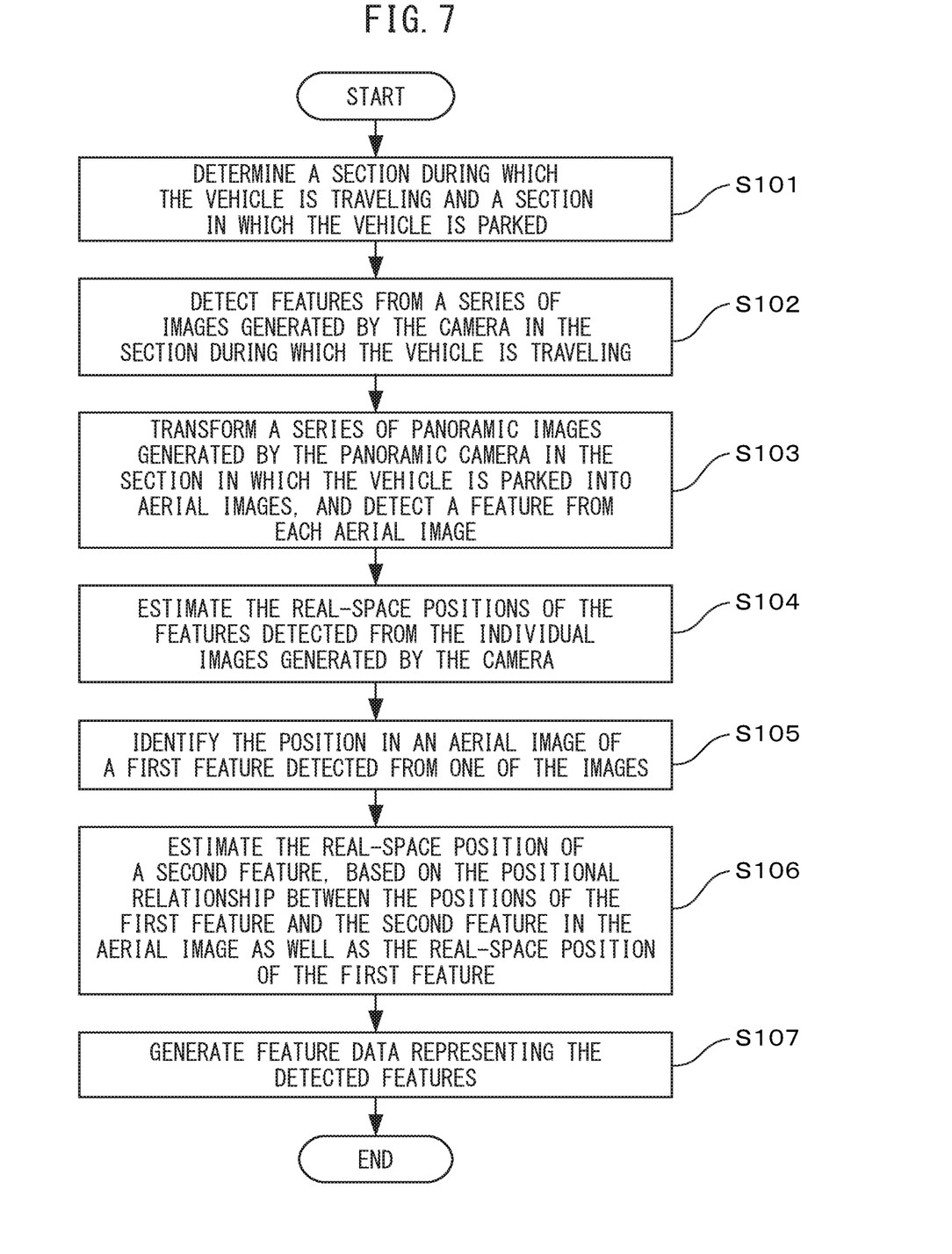
FIG. 7 is an operation flowchart of the feature detection process.

FIG. 7 is an operation flowchart of the feature detection process by the server 3. Upon receiving image information and travel information regarding a predetermined section of road in a collection target region from the vehicle 2, the processor 34 of the server 3 executes the feature detection process in accordance with the operation flowchart described below.

The switching determination unit 43 of the processor 34 determines a section of road in which the vehicle 2 is traveling and a section of road in which the vehicle 2 is parked, in the predetermined section of road (step S101). The switching determination unit 43 then instructs the first detection unit 41 to detect features in the section of road in which the vehicle 2 is traveling and the second detection unit 42 to detect features in the section of road in which the vehicle 2 is parked.

The first detection unit 41 of the processor 34 detects a feature from each of a series of images generated by the camera 11 in the section of road in which the vehicle 2 is traveling, and estimates the type of the feature (step S102). The second detection unit 42 of the processor 34 transforms individual panoramic images generated by the panoramic camera 12 in the section of road in which the vehicle 2 is parked into aerial images, detects a feature from each aerial image, and estimates the type of the feature (step S103). The second detection unit 42 may directly detect features from individual panoramic images generated by the panoramic camera 12 in the section of road in which the vehicle 2 is parked, as described above.

The position estimation unit 44 of the processor 34 estimates the real-space positions of the features detected from the individual images generated by the camera 11 (step S104). The position estimation unit 44 further identifies the position in an aerial image of a first feature detected from an image generated by the camera 11 (step S105). The position estimation unit 44 then estimates the real-space position of a second feature detected from the aerial image, based on the positional relationship between the identified position and the second feature in the aerial image as well as the real-space position of the first feature (step S106).

The data generation unit 45 of the processor 34 includes the types and the real-space positions of the detected features in feature data to generate feature data representing the detected features (step S107). The processor 34 then terminates the feature detection process.

As has been described above, during travel of the vehicle, the feature detection device detects features from time-series images generated by the first image capturing unit, which can capture a relatively large area extending relatively far from the vehicle. This increase the possibility that the same feature is represented in two or more images generated at different positions, enabling the feature detection device to estimate the position of the feature accurately. At the time of parking the vehicle, the feature detection device detects a feature from a second image generated by the second image capturing unit, which captures an area relatively close to the vehicle. This enables the feature detection device to detect a feature that cannot be seen from the first image capturing unit because of, for example, an obstacle, from the second image. In addition, the feature detection device estimates the real-space position of the feature detected from the second image, based on the real-space position of a feature detected from a first image. This enables the feature detection device to accurately estimate the position of the feature detected from the second image generated at the time of parking the vehicle, at which the accuracy of position estimation by SfM is insufficient because of low-speed travel or a large steering angle. Thus the feature detection device can appropriately generate feature data representing the detected features.

The processing of the units of the processor 34 of the server 3 according to the embodiment or modified example may be executed by the processor 23 of the data acquisition device 15 mounted on the vehicle 2. In this case, the data acquisition device 15 is another example of the feature detection device. The data acquisition device 15 may transmit generated feature data to the server 3 via the wireless communication terminal 14. In this case, the switching determination unit 43 may determine whether the vehicle 2 is parked, in real time, based on information indicating the motion of the vehicle 2 obtained from the ECU. Based on the result of determination, the first detection unit 41 or the second detection unit 42 may detect a feature successively from the latest image generated by the camera 11 or the latest panoramic image generated by the panoramic camera 12. Alternatively, part of the processing of the units of the processor 34 of the server 3 may be executed by the processor 23 of the data acquisition device 15. For example, the processor 23 may transform time-series panoramic images generated by the panoramic camera 12 into aerial images, include each aerial image in image information, and transmit the image information to the server 3. Alternatively, the processor 23 may execute the processing of the switching determination unit 43, and include only images generated by the camera 11 in image information, in a section of road in which the switching determination unit 43 determines that the vehicle 2 is traveling. In a section of road in which the vehicle 2 is parked, the processor 23 may include only panoramic images generated by the panoramic camera 12 or aerial images generated from the panoramic images in image information.

Alternatively, the detected features may be used for a purpose other than generation and update of a map. For example, the types and the positions of the detected features may be used for control of the vehicle 2 by the ECU of the vehicle 2. In this case, the data generation unit may be omitted.

The computer program for causing a computer to achieve the functions of the units included in the processor of the feature detection device according to the embodiment or modified examples may be provided in a form recorded on a computer-readable storage medium. The computer-readable storage medium may be, for example, a magnetic medium, an optical medium, or a semiconductor memory.

As described above, those skilled in the art may make various modifications according to embodiments within the scope of the present invention.

What is claimed is:

1. A feature detection device comprising:
a processor configured to:
determine whether a vehicle is parked, based on at least one of the speed, steering angle, and shifter position of the vehicle,
detect one or more predetermined features from a first image representing a first area around the vehicle in a section of road in which the vehicle is traveling, the first image being generated by a first camera provided on the vehicle,
detect the one or more predetermined features from a second image representing a second area closer to the vehicle than the first area in a section of road in which the vehicle is parked, the second image being generated by a second camera provided on the vehicle;
execute viewpoint transformation on the second image to generate an aerial image, and detect the one or more predetermined features from the generated aerial image;
estimate a positional relationship between the vehicle and a first feature among the one or more predetermined features, based on the position of the first feature in each of two or more of the first images acquired at different timings during travel of the vehicle and the distance traveled by the vehicle between the timings of acquisition of the two or more of the first images,
estimate a real-space position of the first feature, based on the estimated positional relationship,
identify the position of the first feature in the aerial image, based on the positional relationship between the vehicle and the first feature, and
estimate a real-space position of a second feature detected from the aerial image among the one or more predetermined features, based on a positional relationship between the positions of the first feature and the second feature in the aerial image as well as the real-space position of the first feature.

2. The feature detection device according to claim 1, wherein the processor is further configured to generate data representing the one or more detected predetermined features.

3. A method for detecting a feature, comprising:
   determining whether a vehicle is parked, based on at least one of the speed, steering angle, and shifter position of the vehicle;
   detecting one or more predetermined features from a first image representing a first area around the vehicle in a section of road in which the vehicle is traveling, the first image being generated by a first image capturing unit provided on the vehicle;
   detecting the one or more predetermined features from a second image representing a second area closer to the vehicle than the first area in a section of road in which the vehicle is parked, the second image being generated by a second image capturing unit provided on the vehicle;
   executing viewpoint transformation on the second image to generate an aerial image, and detects the one or more predetermined features from the generated aerial image;
   estimating a positional relationship between the vehicle and a first feature among the one or more predetermined features, based on the position of the first feature in each of two or more of the first images acquired at different timings during travel of the vehicle and the distance traveled by the vehicle between the timings of acquisition of the two or more of the first images,
   estimating a real-space position of the first feature, based on the estimated positional relationship,
   identifying the position of the first feature in the aerial image, based on the positional relationship between the vehicle and the first feature, and
   estimating a real-space position of a second feature detected from the aerial image among the one or more predetermined features, based on a positional relationship between the positions of the first feature and the second feature in the aerial image as well as the real-space position of the first feature.

4. A non-transitory recording medium that stores a computer program for detecting a feature, the computer program causing a computer to execute a process comprising:
   determining whether a vehicle is parked, based on at least one of the speed, steering angle, and shifter position of the vehicle;
   detecting one or more predetermined features from a first image representing a first area around the vehicle in a section of road in which the vehicle is traveling, the first image being generated by a first image capturing unit provided on the vehicle;
   detecting the one or more predetermined features from a second image representing a second area closer to the vehicle than the first area in a section of road in which the vehicle is parked, the second image being generated by a second image capturing unit provided on the vehicle;
   executing viewpoint transformation on the second image to generate an aerial image, and detects the one or more predetermined features from the generated aerial image;
   estimating a positional relationship between the vehicle and a first feature among the one or more predetermined features, based on the position of the first feature in each of two or more of the first images acquired at different timings during travel of the vehicle and the distance traveled by the vehicle between the timings of acquisition of the two or more of the first images,
   estimating a real-space position of the first feature, based on the estimated positional relationship,
   identifying the position of the first feature in the aerial image, based on the positional relationship between the vehicle and the first feature, and
   estimating a real-space position of a second feature detected from the aerial image among the one or more predetermined features, based on a positional relationship between the positions of the first feature and the second feature in the aerial image as well as the real-space position of the first feature.

* * * * *